(12) United States Patent
Knee et al.

(10) Patent No.: US 7,978,913 B2
(45) Date of Patent: Jul. 12, 2011

(54) IMAGE SEGMENTATION BASED ON PROCESSING OF A GRAPH

(75) Inventors: Michael James Knee, Petersfield (GB); Martin Weston, Petersfield (GB)

(73) Assignee: Snell & Wilcox Limited, Hampshire (GB)

( * ) Notice: Subject to any disclaimer, the term of this patent is extended or adjusted under 35 U.S.C. 154(b) by 879 days.

(21) Appl. No.: 11/720,025

(22) PCT Filed: Nov. 25, 2005

(86) PCT No.: PCT/GB2005/004520
§ 371 (c)(1),
(2), (4) Date: Oct. 10, 2007

(87) PCT Pub. No.: WO2006/056786
PCT Pub. Date: Jun. 1, 2006

(65) Prior Publication Data
US 2008/0037870 A1    Feb. 14, 2008

(30) Foreign Application Priority Data
Nov. 26, 2004    (GB) .................... 0426038.6

(51) Int. Cl.
*G06K 9/34* (2006.01)
*G06K 9/46* (2006.01)
*G06K 9/66* (2006.01)
*G06K 9/68* (2006.01)
*G06K 9/70* (2006.01)

(52) U.S. Cl. ......... 382/173; 382/190; 382/195; 382/226

(58) Field of Classification Search .................. None
See application file for complete search history.

(56) References Cited

U.S. PATENT DOCUMENTS

| | | | | |
|---|---|---|---|---|
| 7,127,104 B2 * | 10/2006 | Prasad et al. | .................. | 382/164 |
| 7,724,256 B2 * | 5/2010 | Grady et al. | .................. | 345/440 |
| 2004/0141643 A1 * | 7/2004 | Marquering et al. | ......... | 382/173 |
| 2006/0050959 A1 * | 3/2006 | Grady et al. | .................. | 382/173 |
| 2006/0062457 A1 * | 3/2006 | Grady | .......................... | 382/173 |
| 2007/0058865 A1 * | 3/2007 | Li et al. | ....................... | 382/173 |

FOREIGN PATENT DOCUMENTS

JP    2002184171    6/2002

(Continued)

OTHER PUBLICATIONS

Wangqing Li; Mingren Shi; Ogunbona, P.; "A New Divide and Conquer Algorithm for Graph-based Image and Video Segmentation", IEEE 7th Workshop on Multimedia Signal Processing, 2005, pp. 1-4.*

(Continued)

*Primary Examiner* — Samir A Ahmed
*Assistant Examiner* — Li Liu
(74) *Attorney, Agent, or Firm* — Fish & Richardson P.C.

(57) ABSTRACT

A method of image segmentation using graph-theory techniques, in which pixels of an image are represented by the vertices of a graph. A minimum spanning tree is generated and edges of the tree are successively removed according to a morphological property to leave a spanning forest, trees of which correspond to segments of the image. Selection of edges for removal may depend on an energy function of a tree and on the energy function of trees created by removal of that edge.

19 Claims, 15 Drawing Sheets

FOREIGN PATENT DOCUMENTS

JP    2004288158    10/2004

OTHER PUBLICATIONS

Jagannathan, A.; Miller, E.; "On the determination of inconsistent edges in graph-based segmentation algorithms", Thirty-Sixth Asilomar Conference on Signals, Systems and Computers, 2002. 488-491 vol. 1.*

Ying Xu; Olman, V.; Uberbacher, E.C.; "A segmentation algorithm for noisy images", IEEE International Joint Symposia on Intelligence and Systems, 1996, 220-226.*

P. Felzenszwalb, D. Huttenlocher: "Efficient Graph-Based Image Segmentation". IJCV 59(2) (Sep. 2004).*

Ahmed et al., "A novel graph-theoretic texture segmentation algorithm", Speech Processing 2, VLSI, Underwater Signal Processing, Toronto, May 14-17, 1991, International Conference on Acoustics, Speech and Signal Processing, New York, IEEE, US, vol. 2, Conf. 16, pp. 2709-2712.

Daskalaklis et al., "European Association for Signal Processing: A Graph-Theoretic Algorithm for Unsupervised Image Segmentation", Proceedings of the European Signal Processing Conference, vol. 3, Conf. 4, Sep. 5, 1988, pp. 1621-1624.

Felzenszwalb et al., "Image segmentation using local variation", IEEE Computer Society Conference on Santa Barbara, CA, USA, Jun. 23-25, 1998, pp. 98-104.

Morris et al., "A unified Method for Segmentation and Edge Detection using Graph Theory", IEEE, New York, USA, vol. 3, Conf. 11, Apr. 7, 1986, pp. 2051-2054.

Scanlon et al., "Graph-theoretic algorithms for image segmentation", IEEE International Symposium on Orlando, FL, USA May 30, 1999, pp. 141-144.

Zahn et al., "Graph-Theoretical Methods for Detecting and Decscibing Gesalt Clusters", IEEE Transactions on Computers, Los Alamitos, CA, USA, vol. C-20, No. 1, Jan. 1971, pp. 68-86.

* cited by examiner

IMAGE SEGMENTATION BASED ON PROCESSING OF A GRAPH

This invention relates to image and/or video processing, and in particular to segmentation of image data using graph-theoretic techniques.

Segmentation is useful in a number of applications including noise reduction and compression of image and video data, and a wide variety of approaches to image segmentation have previously been proposed. Such proposals include thresholding, the watershed algorithm, morphological scale-space transforms or sieves, region splitting and merging, clustering, frequency-domain techniques and techniques involving motion estimation. However, few if any of those approaches produce good-quality hierarchical segmentation of multiple-component images using low to moderate processing resources.

The present invention uses several concepts from the branch of mathematics known as graph theory. A brief description of terminology used in graph theory follows.

Figure 1:
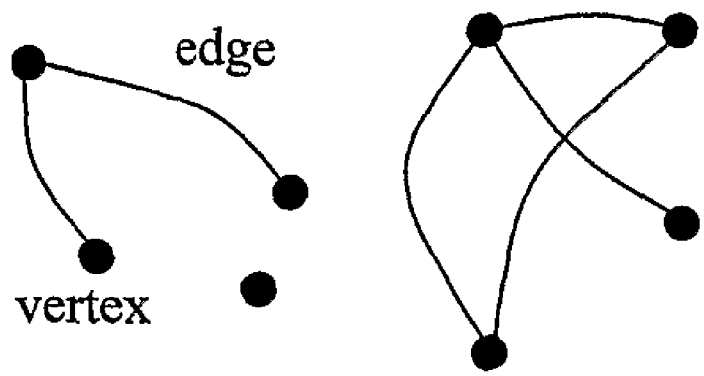

A graph consists of points (known as vertices) which may be connected together by lines (known as edges). An example of a graph is shown in FIG. 1.

The degree of a vertex is the number of edges adjoining it. In FIG. 1, the degrees of the vertices range from 0 to 3. A vertex is called a leaf if it has degree 1; the graph of FIG. 1 has three leaves.

Both edges and vertices can have numbers or weights associated with them. These weights may have some physical significance; for example, in a graph in which the vertices represent towns and the edges roads, the edge weights might represent the lengths of the roads.

A subgraph of a graph G is a graph whose vertices are a subset of the vertices of G and whose edges are a subset of the edges of G. A subgraph spans G if it has all the vertices of G. A path in G is a set of distinct edges each of which shares a vertex with the preceding one. For a more precise definition, reference is directed to Bollobás, Béla. Graph theory—an introductory course. Springer-Verlag, New York, 1979.

A tree is a graph in which there is exactly one path from any given vertex to any other. A forest is a disconnected set of trees. A spanning tree or spanning forest of a graph G is a tree or forest that is a spanning subgraph of G. In an edge-weighted graph, a minimum spanning tree (MST), also known as a shortest or economical spanning tree, of the graph is a spanning tree that minimizes the sum of the edge weights in the tree.

Figure 4:
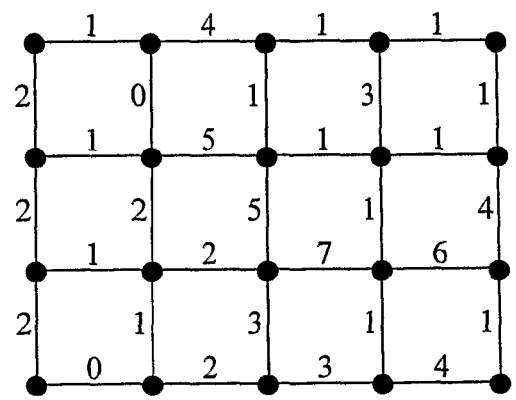
Figure 5:
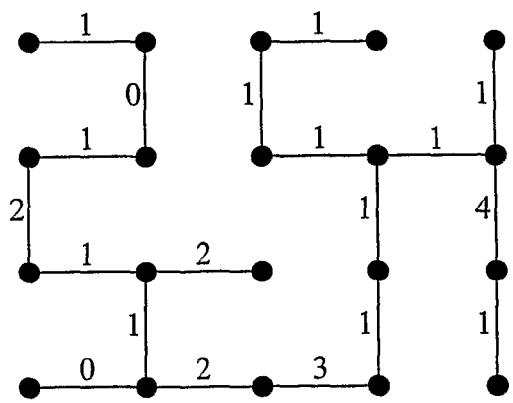

Known algorithms exist for finding a minimum spanning tree of an edge-weighted graph. One is Kruskal's algorithm, which maintains a set of partial minimum spanning trees and repeatedly adds the minimum-weight (or lightest) edge whose vertices are in different spanning trees. Another is Prim's algorithm, which begins with a single vertex and builds up the tree by repeatedly adding the lightest edge that joins the tree to a vertex not yet in the tree, the vertex then being added to the tree. In FIGS. 4 and 5 described in greater detail below, FIG. 5 shows a minimum spanning tree of FIG. 4.

Figure 2:
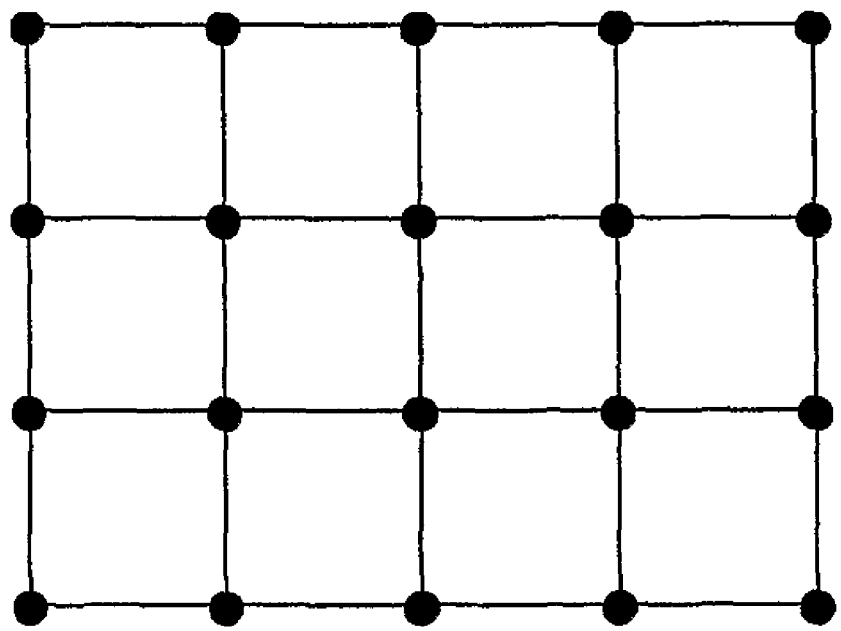

The application of graph theory to images will now be considered. Vertices of a graph can be used to represent pixels and the edges can be used to represent adjacency of pixels. In this document, two pixels are adjacent, and therefore have an edge joining them, if one is directly above, below, to the left or to the right of the other. This is the 4-connected definition of adjacency; a 6-connected or 8-connected definition may also be used. With the 4-connected definition, an image may be represented by a graph as shown in FIG. 2. The degree of each vertex not representing a pixel on the image boundary is 4. Note that the word "edge" as used in graph theory has very little to do with the concept of an edge in an image or to the boundary of an image.

Edge weights in such a graph may be used to represent some measure of the difference between adjacent pixels. For example, in a luminance image, the edge weight may be defined as the absolute difference between the two luminance values.

Figure 3:
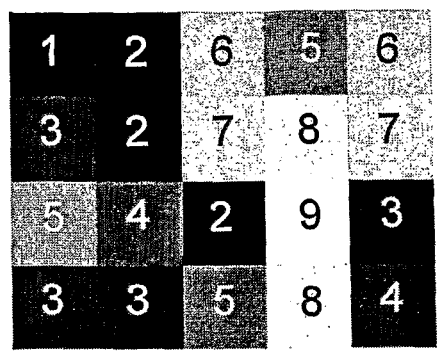

FIG. 3 shows an exemplary 5×4 luminance image, with pixel values as shown, and FIG. 4 shows the graph representing this image in which edge weights equal to the absolute difference between adjacent pixel values have been assigned.

The MST can be used as the basis of an image segmentation algorithm. It can be seen that if an edge is removed from a tree, two trees will be formed, each of which in the context of images will describe a connected subset of vertices, i.e. a segment, of the image. So, in order to break an image into N segments, N−1 edges are removed from the MST. It has previously been proposed that the edges selected for removal are simply the N−1 maximum-weight (or heaviest) edges in the MST. For example, in order to break the image represented by FIG. 5 into 2 segments, the edge weighted 4 would be removed, producing the segmentation shown in FIG. 6.

Figure 7:
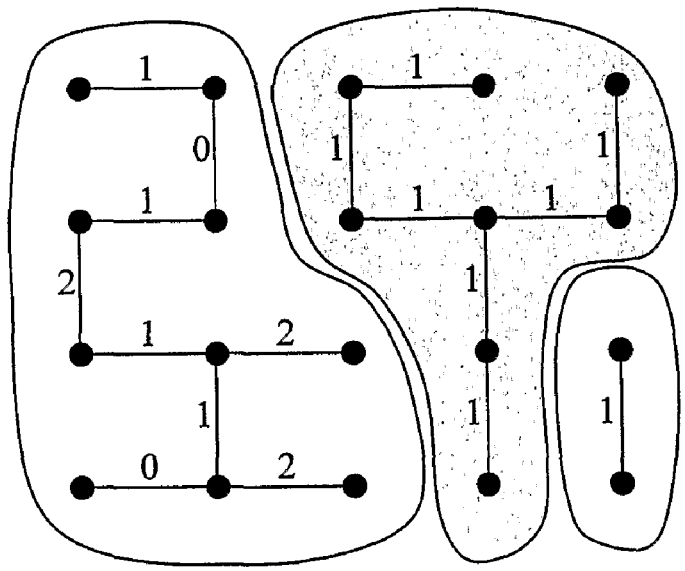

If 3 segments were required, the second heaviest edge (weighted 3) would also be removed; producing the segmentation shown in FIG. 7.

However, this method has been found to suffer from a number of disadvantages.

It is an object of the present invention to provide an improved method of image segmentation.

According to the first aspect of the present invention there is provided a method of image segmentation, in which the pixels of the image are represented by the vertices of a graph, the adjacency of pixels is represented by the edges of the graph, the edges are assigned weights representing a measure of dissimilarity between adjacent pixels, a minimum spanning tree of the graph (or an approximation thereto) is generated, and edges are removed successively from the minimum spanning tree to create a spanning forest, the trees of which correspond to segments of the image, wherein the selection of an edge for removal from the spanning forest depends on a measure of distance from the edge to leaves of a tree in which the edge resides.

A particular disadvantage identified by the present inventor is that there is often a huge imbalance in the sizes of the segments created by selecting edges using the prior art criteria described above. It has been found that in the prior art process of finding the MST, many of the heaviest edges from the original graph are removed, but the heaviest remaining edges are often to be found near the leaves of the tree. This means that removal of a heavy edge often results in a new segment with only one pixel.

The present invention overcomes the limitations of the prior art by using a novel method of selecting which edge to remove from the MST at each stage. The idea behind the invention is to use a measure of the likelihood that the removal of the edge will produce segments of reasonable size. The criterion can depend on the two trees that would be created by removal of the edge. In one embodiment the criterion can depend on a measure of size, for example using the number of vertices to measure size. In another embodiment the criterion may depend on the difference between a function of the pixels in the tree containing the edge and the sum of the values of the function of the pixels in the two trees that would be created by removal of the edge.

This novel algorithm has some very attractive features. Finding an MST requires only moderate computing complexity, and performing the subsequent segmentation is very easy. It is possible to specify the number of segments exactly, unlike some algorithms that are threshold-based. Best of all, the algorithm is perfectly hierarchical in that a segmentation into a given number of segments is always contained within a segmentation into more segments. The method also works on multi-component image data (for example, images described by R,G,B values). In an image described by more than one component, for example an RGB image, the edge weight might be the sum of the absolute or squared differences between the components, the maximum absolute difference, or any other suitable measure.

The invention also provides apparatus adapted to carry out methods substantially as herein described, which in one embodiment may comprise a digital circuit. The invention may be embodied in data compression methods and apparatus and other image or video processing applications.

Figure 6:
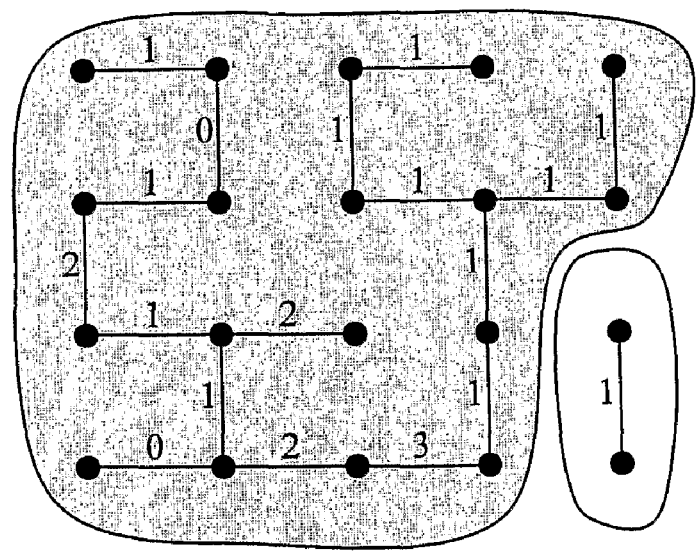
Figure 8:
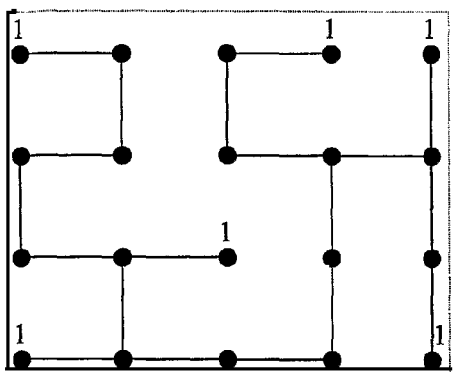
Figure 8:
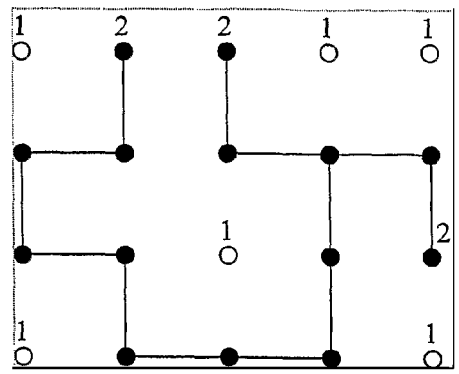
Figure 8:
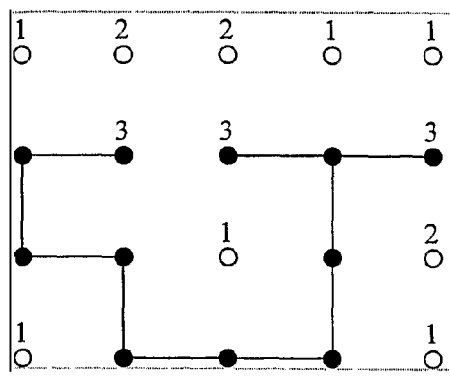
Figure 8:
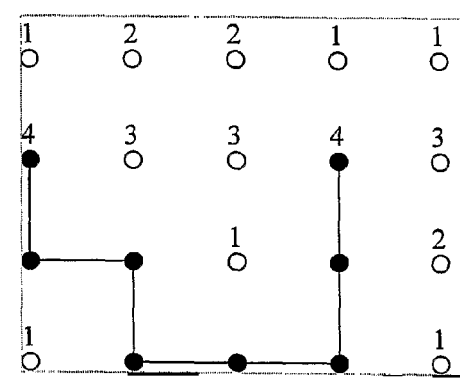
Figure 8:
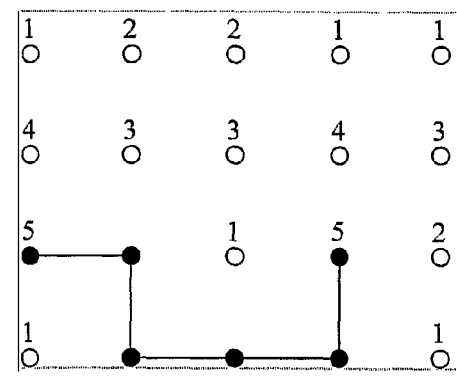
Figure 8:
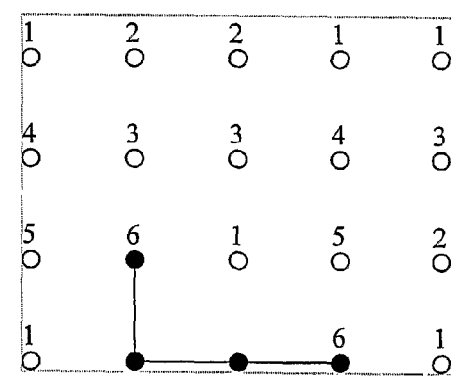
Figure 8:
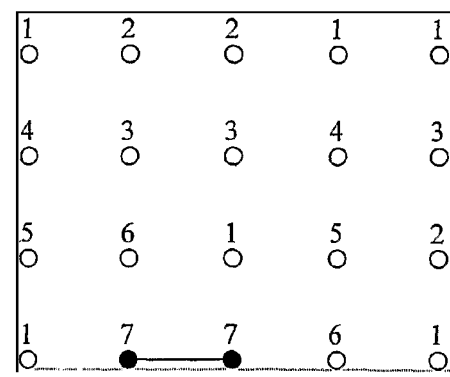
Figure 9:
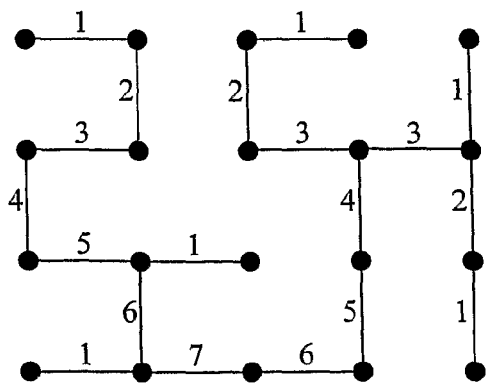
Figure 10:
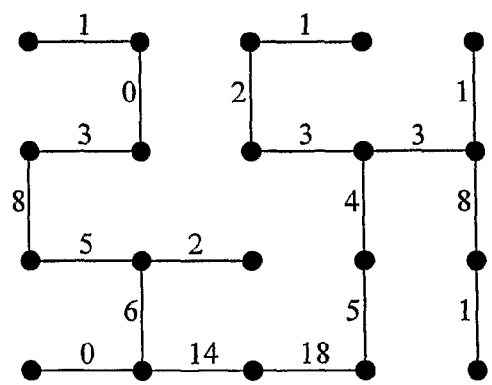
Figure 11:
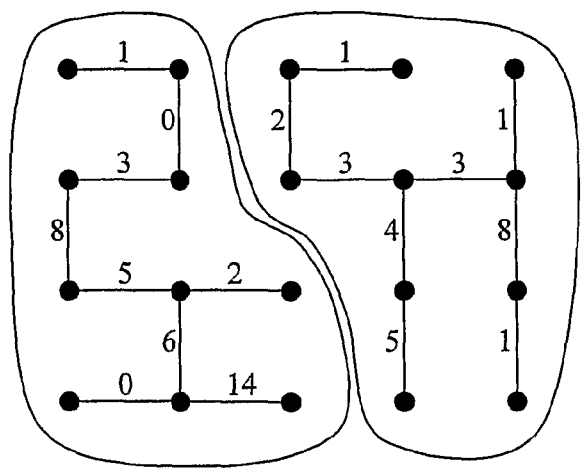
Figure 12:
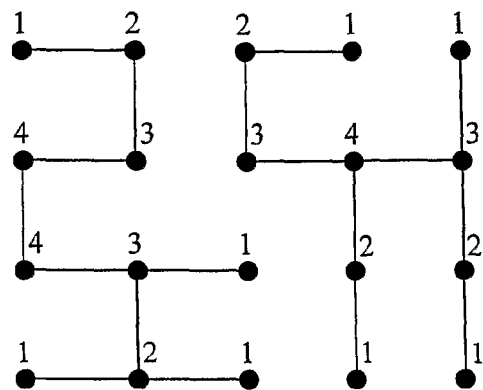
Figure 13:
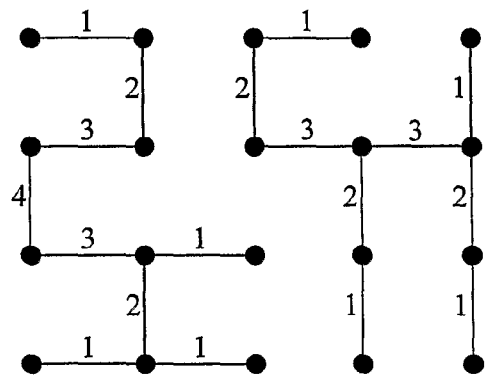
Figure 14:
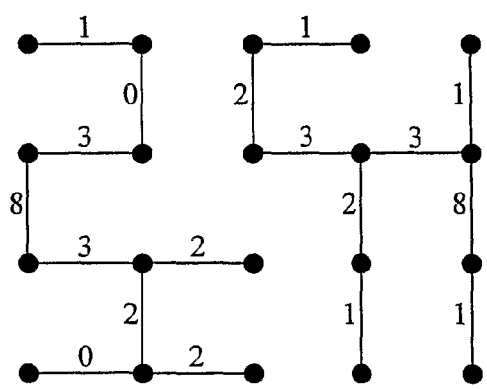
Figure 15:
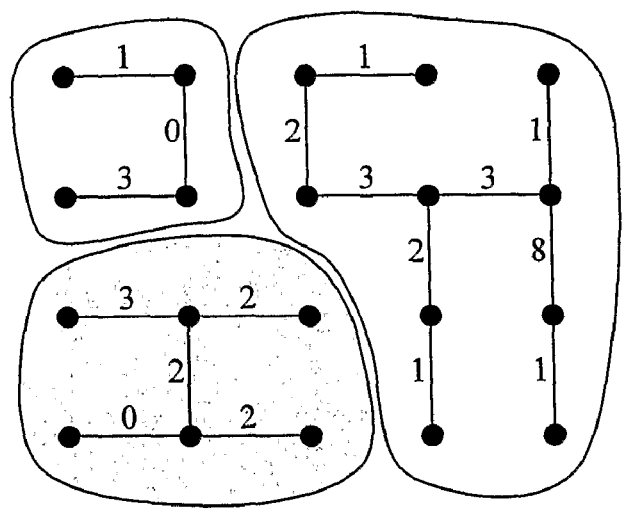
Figure 16:
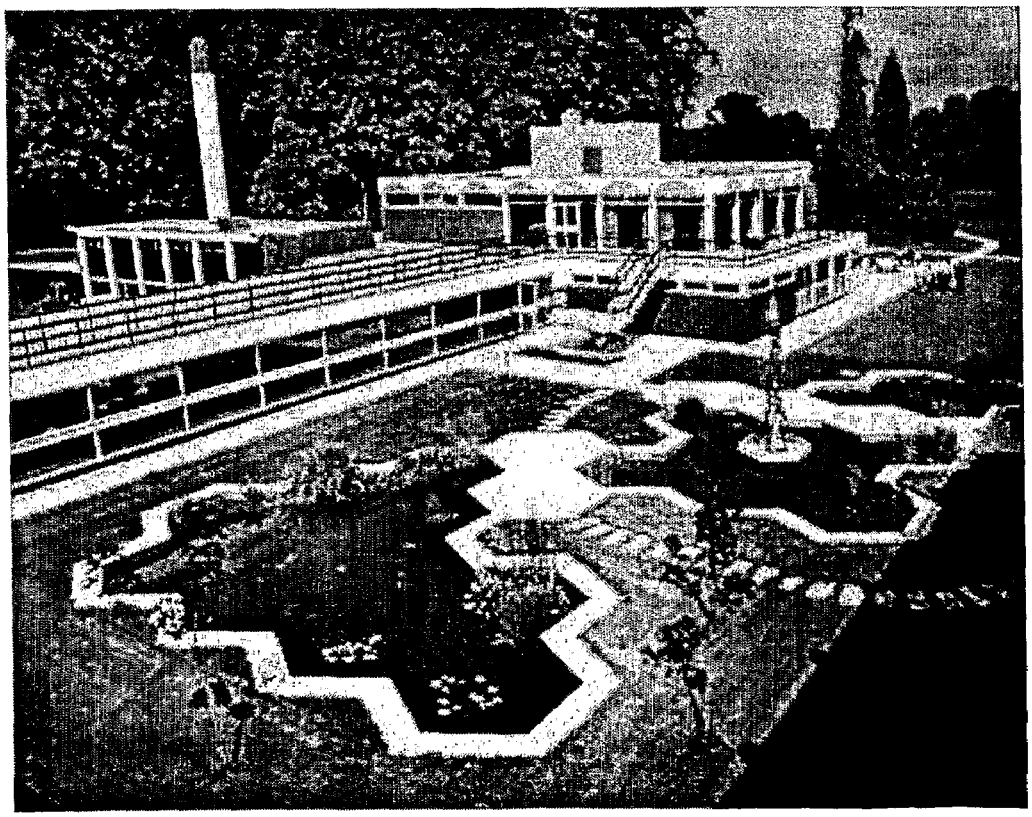
Figure 17:
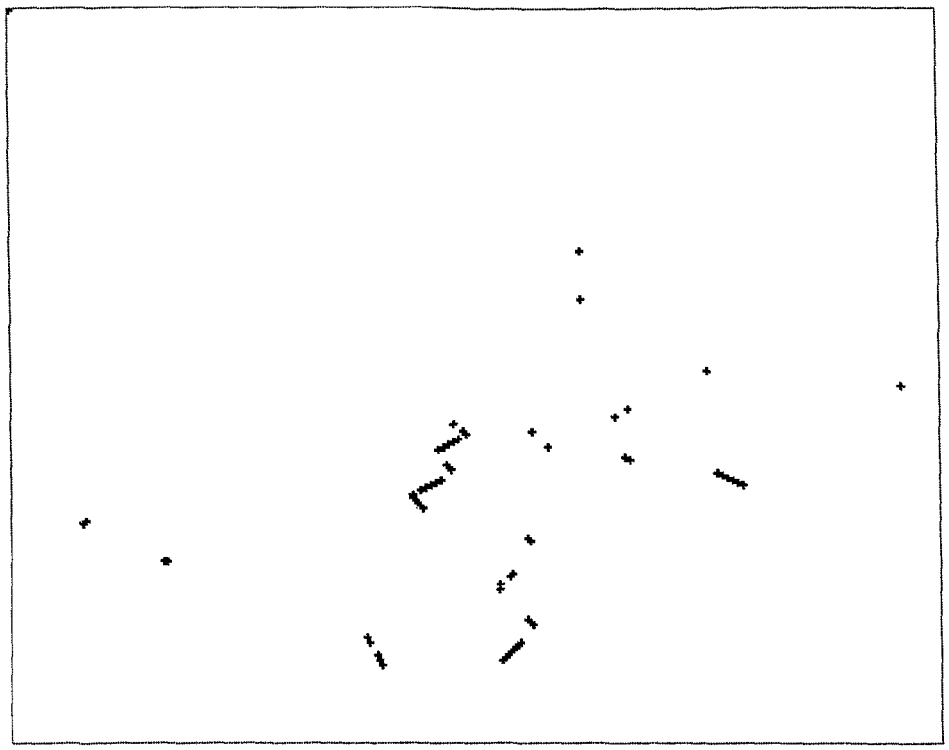
Figure 18:
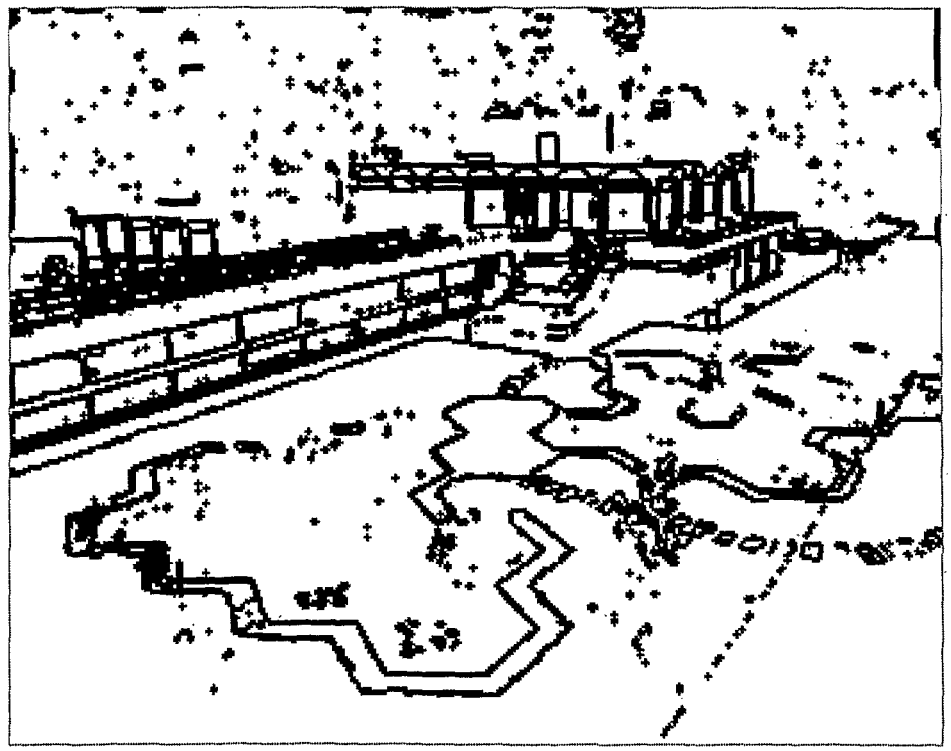
Figure 19:
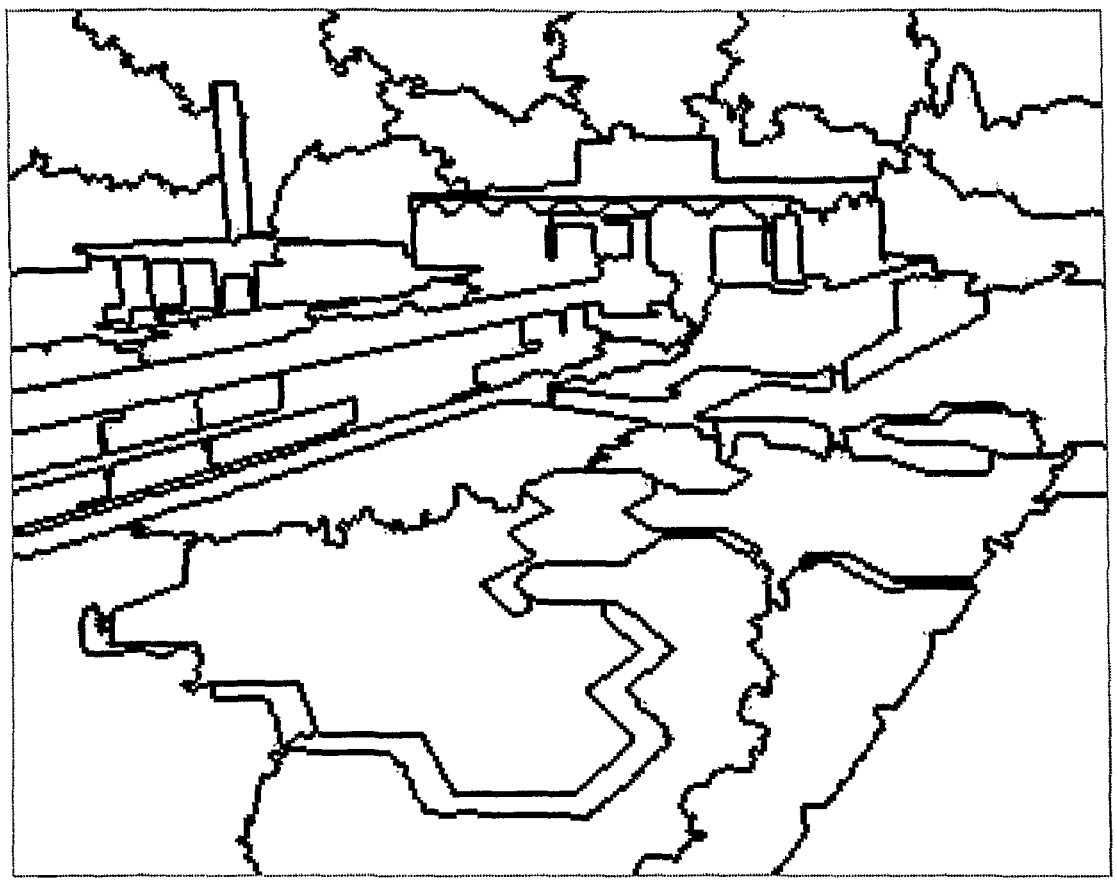
Figure 20:
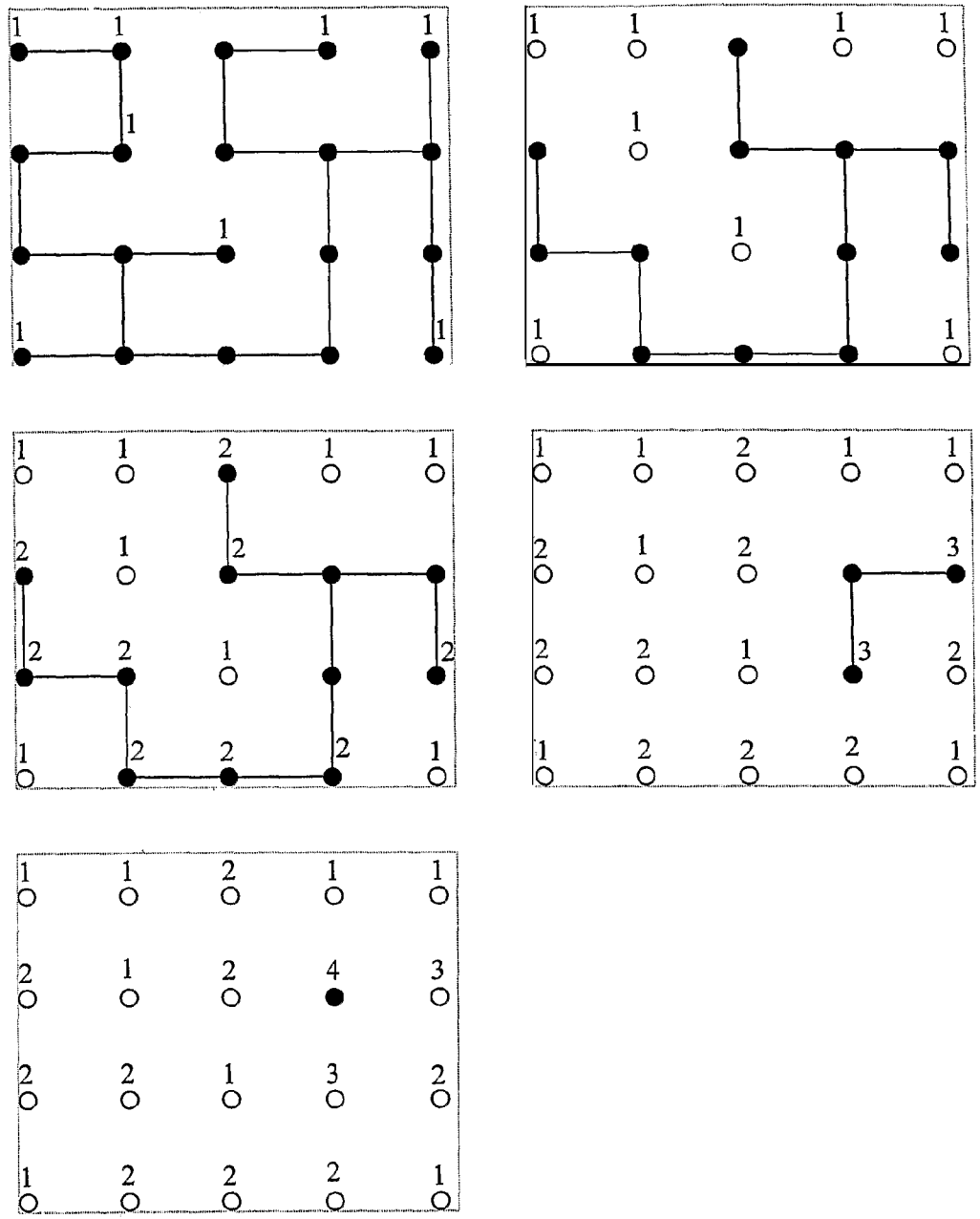
Figure 21:
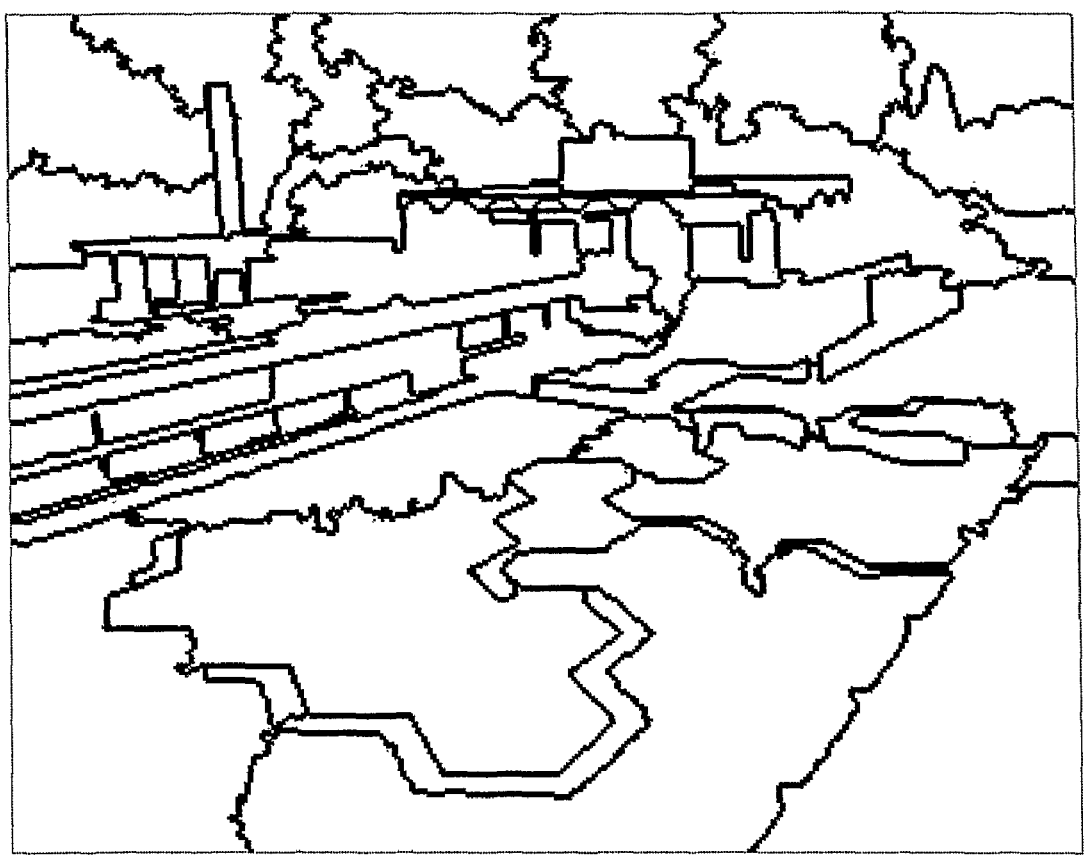
Figure 22:
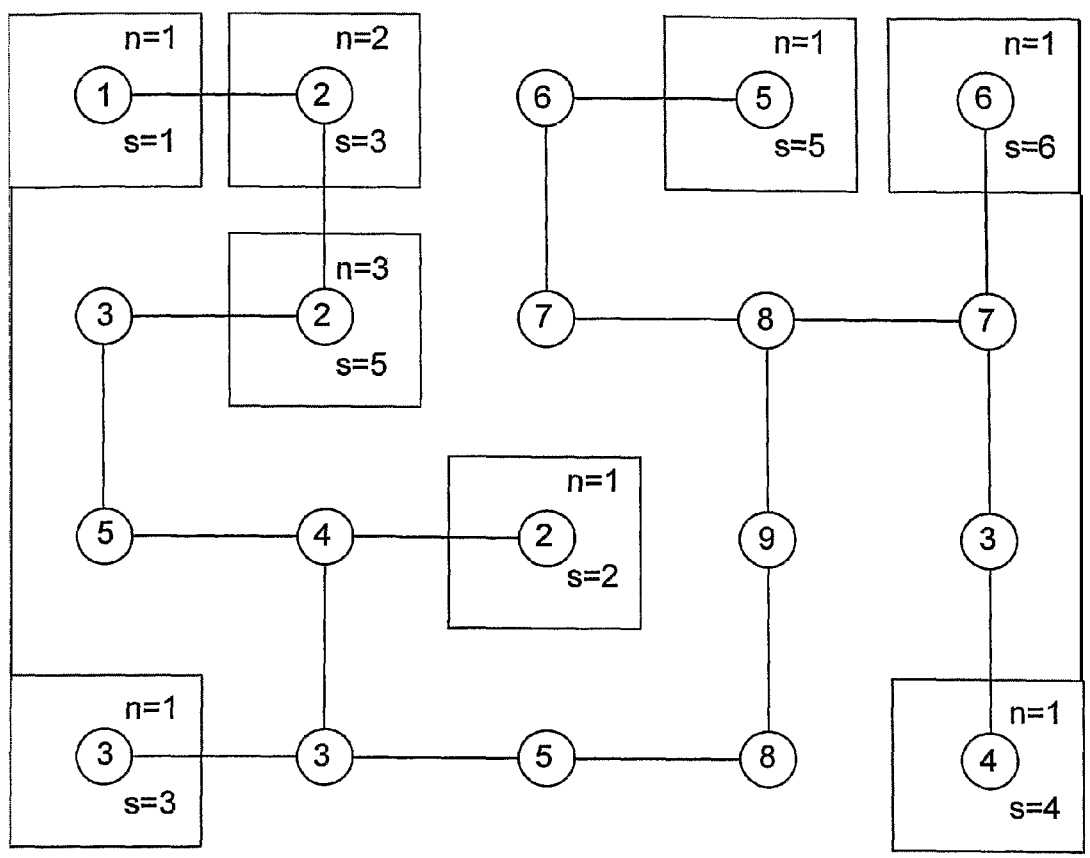
Figure 23:
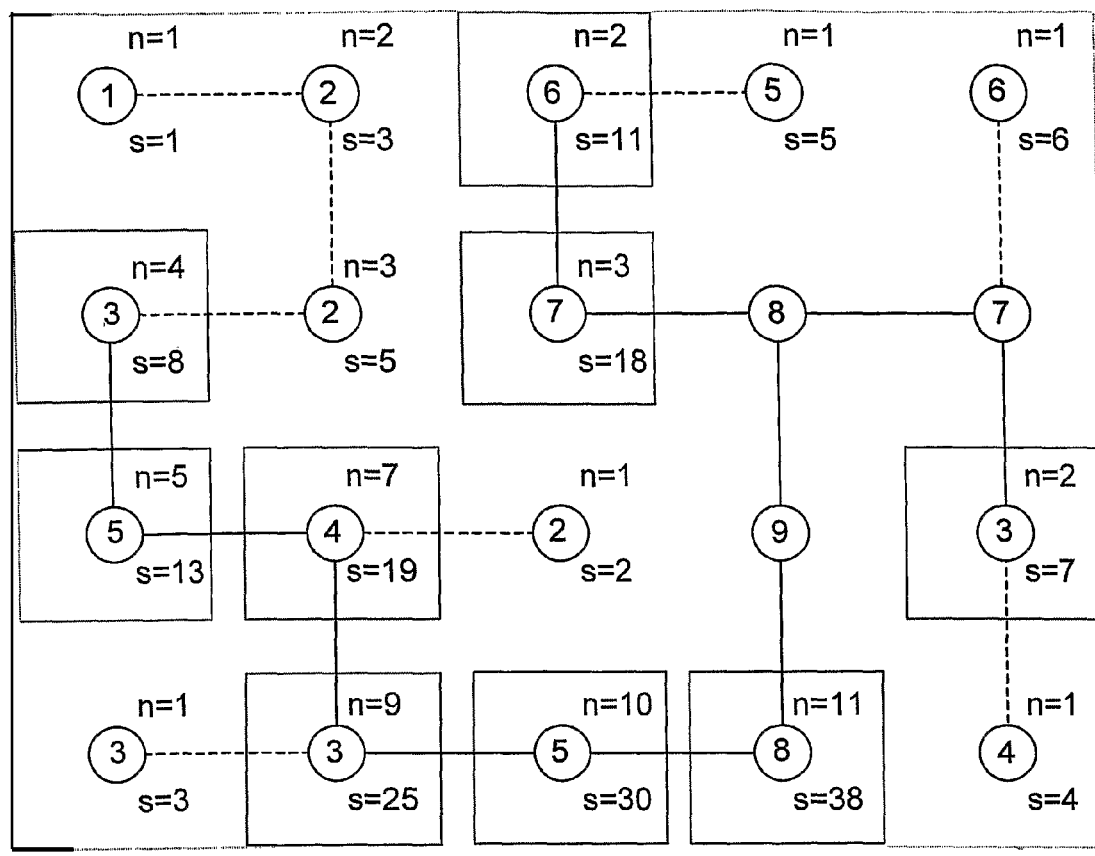
Figure 24:
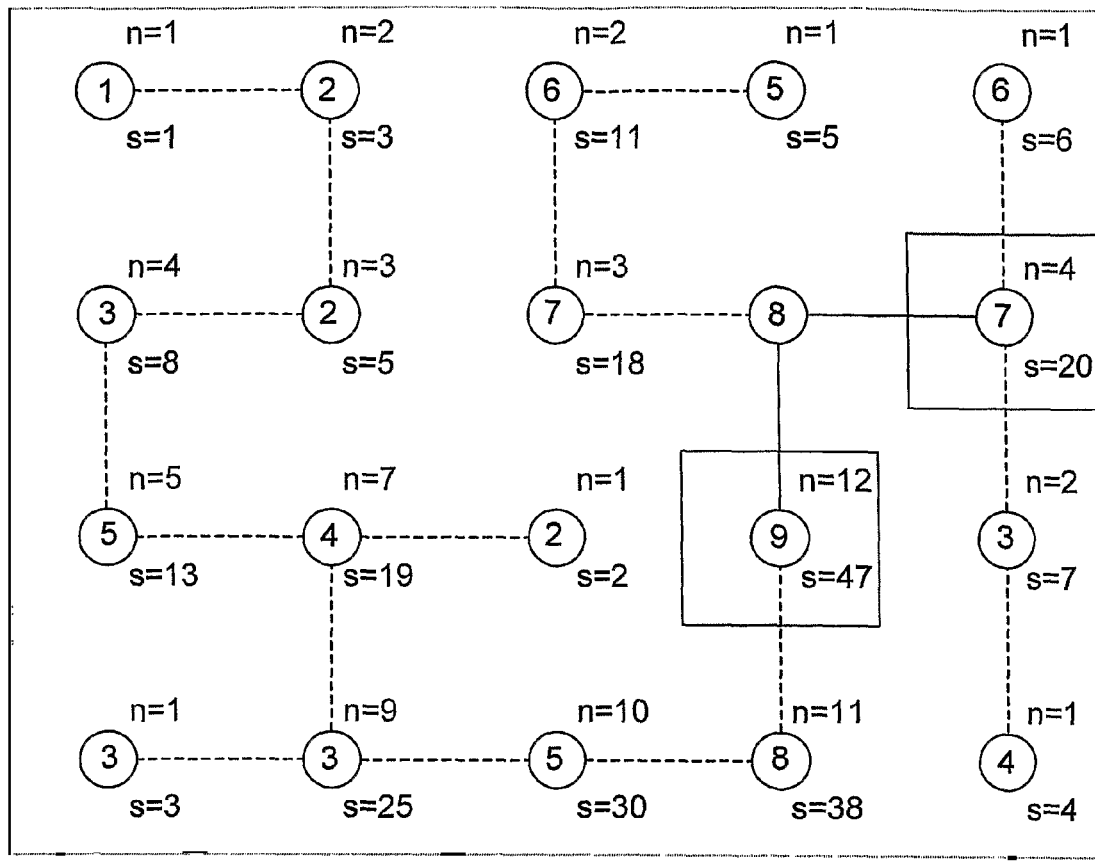
Figure 25:
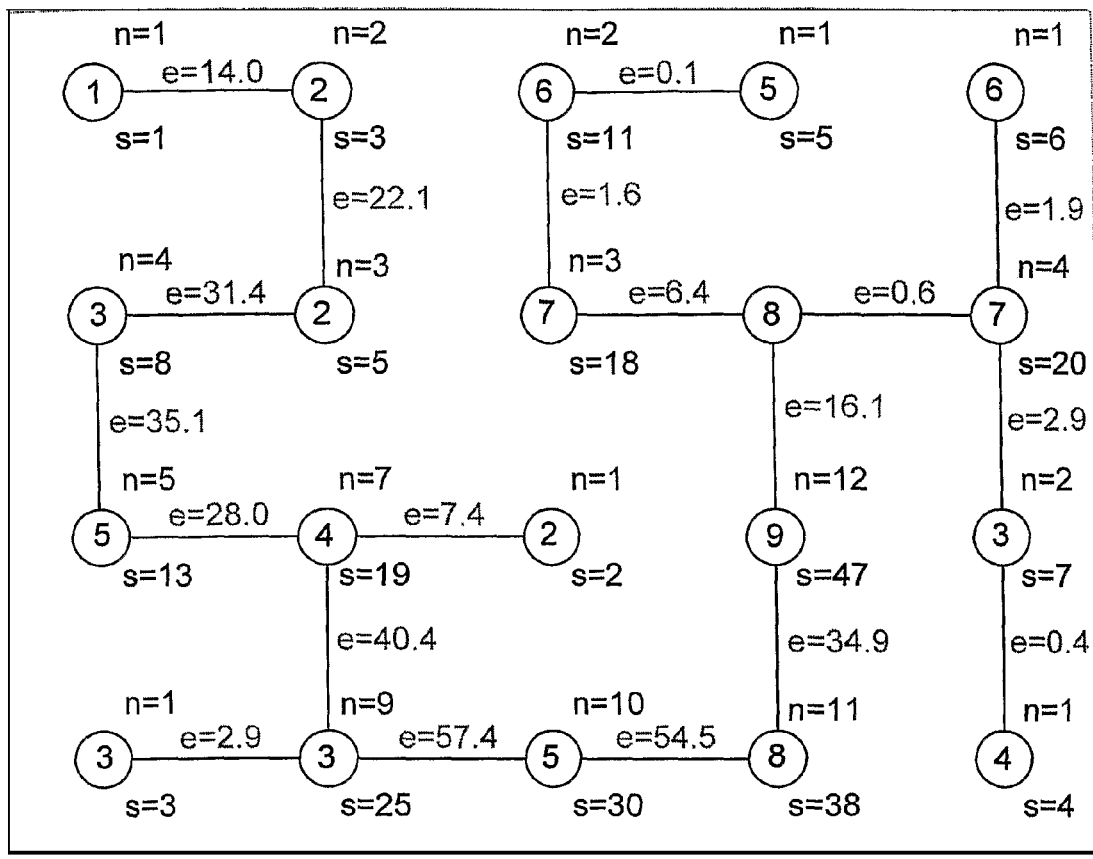

The invention will now be described by way of example only, with reference to the accompanying figures in which:

FIG. 1 is an example of a graph;
FIG. 2 is a representation of a 5×4 image as a graph;
FIG. 3 is an exemplary small luminance image;
FIG. 4 is an edge weighted graph representation of FIG. 3;
FIG. 5 is a minimum spanning tree of FIG. 4;
FIG. 6 is an MST segmentation of FIG. 5 into two segments;
FIG. 7 is an MST segmentation of FIG. 5 into three segments;
FIG. 8 illustrates successive stages in calculating seclusion;
FIG. 9 is a seclusion map of FIG. 5;
FIG. 10 shows a product of seclusion and edge weights;
FIG. 11 is a segmentation of FIG. 5 into two segments using seclusion processing;
FIG. 12 shows a vertex seclusion map;
FIG. 13 shows an edge seclusion map;
FIG. 14 shows the product of modified seclusion values and edge weights;
FIG. 15 is a segmentation of FIG. 5 into three segments using seclusion processing;
FIG. 16 is an illustrative test image;
FIG. 17 shows the results of an attempted segmentation of FIG. 16 into 64 segments using a described prior art algorithm;
FIG. 18 shows the results of segmentation of FIG. 16 into 4000 segments using a described prior art algorithm;
FIG. 19 shows the results of segmentation of FIG. 16 into 64 segments using an embodiment of the present invention;
FIG. 20 illustrates a simplified seclusion calculation;
FIG. 21 shows the results of segmentation of FIG. 16 into 64 segments using an alternative embodiment of the present invention;
FIG. 22 shows a first stage in an exemplary method based on energy calculations;
FIG. 23 shows a second stage in the method based on energy calculations;
FIG. 24 shows a third stage in the method based on energy calculations; and
FIG. 25 shows a fourth stage in the method based on energy calculations.

A novel property, termed here 'seclusion', can be calculated for every pixel in the image at each stage of the segmentation. Considering that the leaves of a tree are "exposed", we deem vertices that are in some sense "far" from the leaves to be "secluded". Seclusion is then the extent to which a vertex is secluded.

Seclusion may be calculated for a tree or a forest by the following algorithm:
  Set current seclusion value S to 0
  While there are edges remaining in the forest:
    Increment S
    Set seclusion of all leaf vertices to S
    Remove all leaf vertices and the edges adjoining them
  If one vertex remains, set its seclusion to S+1

FIG. 8 illustrates how the seclusion is calculated for every pixel in the graph of FIG. 5. At each stage, leaves that have been removed are coloured white.

We have described how to calculate the seclusion of all the vertices in a tree or forest. The seclusion of an edge can be defined in terms of the seclusion of its two vertices, for example, the minimum of the two seclusion values. A seclusion map of the edges of FIG. 5 is shown in FIG. 9.

Alternatively, seclusion values for edges may be calculated directly, using a modified version of the seclusion algorithm described above.

To select an edge for removal, the original edge weightings and the edge seclusion values are combined, for example by multiplication. FIG. 10 shows the product of the original edge weightings and the seclusion map.

To segment the image into 2 segments, the edge with a combined value of 18 would be selected, producing the segmentation shown in FIG. 11. In order to continue the segmentation process, the seclusion map is re-calculated for the forest shown in FIG. 11. The resulting vertex seclusion map is shown in FIG. 12 and the edge seclusion map in FIG. 13. FIG. 14 shows the product of the new seclusion values and the edge weights.

As often happens when integer processing is being used, there is now an ambiguity about the selection of the next highest edge value. If we weight a dead-heat in favour of higher seclusion, we would choose the left-hand of the two edges valued 8, and we would obtain the segmentation shown in FIG. 15.

The above examples illustrate how a seclusion map may be used to help ensure that MST segmentation avoids producing very small segments at early stages in the process. There is of course a trade-off between the importance attached to seclusion and the importance of cutting the forest at a heavy edge. This trade-off can be reflected in the choice of function by which seclusion and edge weighting are combined.

Seclusion may be thought of as a "one-dimensional" measure in that it estimates a distance from an edge or a vertex to the leaves of the tree. A simple modification to the seclusion process may be used to measure the numbers of vertices, i.e. the "areas" of the two trees that would be created by removing an edge. In this modification, the measured quantity is accumulated by adding the quantity associated with leaves that are being removed to the vertices to which the leaves were connected.

In either the seclusion measure or the modified measure described above, the recursive process may additionally involve accumulating the edge weights themselves, so that a weighted seclusion value is calculated directly. It would then not be necessary to multiply the seclusion value by an edge weight for selection of an edge for removal, but simply to maximize the weighted measure.

An illustration of the benefits of seclusion processing in segmenting real images will now be given. FIG. 16 shows the luminance component of the "Formal Pond" image from the EBU standard set of test slides, downconverted to 360×288 pixels. FIGS. 17 and 18 show segment boundaries resulting from attempts to segment this image into 64 and 4,000 segments respectively using the prior art MST approach described above, while FIG. 19 shows the result of segmentation into 64 segments using the MST approach with seclusion processing as described above.

It is not necessary to calculate the seclusion map exactly. For example, a good approximation to a seclusion map may be obtained by removing leaves from the forest "in-place" as the processing follows a raster scanning pattern. This shortened process is illustrated in FIG. 20.

This simplification is asymmetrical and is necessarily imperfect, but in certain embodiments has little effect on the overall performance of the algorithm. For example, FIG. 21 shows the effect of the simplification on the segmentation into 64 regions of "Formal Pond" for comparison with the "correct" seclusion processing used in FIG. 19.

A similar simplification may be used for the modified versions of the seclusion measure described earlier.

It may also be possible to reduce processing time by finding an approximation to the MST. For example, during the operation of Prim's algorithm, an edge could be added if its weight were deemed to be "small enough" according to some criterion, for example based on a pre-calculated distribution of edge weights, so that it would not be necessary at every stage to search the whole tree to look for a minimum weight of adjoining edges.

A further improvement to the invention will now be described. At a given stage in the segmentation process, the use of a combination of the seclusion value and the edge weighting has been used to decide which edge to remove from the forest. This decision can be thought of as having two parts: deciding which tree in the forest to remove an edge from, and deciding which edge to remove from that tree. In a preferred embodiment of the invention, other readily measurable properties of the trees could be used to make the first part of the decision, and then the method of the invention itself could be used to make the second part of the decision. For example, the tree with the highest total or average edge weight could be selected, or the tree with the most vertices, or some other measure or combination of measures could be taken. Such an embodiment has two benefits. The first benefit is that additional information can be taken into account when deciding which tree to split. The second benefit is that seclusion values need only be calculated for the selected tree.

It has been observed that typically partway through the process of calculating seclusion as described above, a simple tree with only two leaves is obtained. The remainder of the process described above simply successively removes the two leaves and increments the current seclusion value. In one embodiment, instead, the process is stopped when a simple tree with two leaves is obtained and the current seclusion value is assigned to the rest of the tree. This modification may speed up the seclusion calculations, or at least avoids having to revert to a second method for handling the two-leaved tree. This alternative approach may bring about an improvement in subjective performance in some situations, because it limits what seems to be an over-emphasis on seclusion compared with edge weights in the central region of the tree.

In a further embodiment, a second or alternative quantity or measure may be calculated during removal of the edges of the tree. This second or alternative quantity or measure is the amount by which the removal of an edge reduces some function of the tree.

If the function on a tree T is defined as f(T), and removal of an edge e splits a tree T into two trees U and V, then the amount by which removal of the edge reduces the function may be given by the expression:

$$f(T) - f(U) - f(V)$$

A suitable function would represent the "energy" of the tree. An example of such an energy function is $$E_T = \sum_{i \in T} (x_i - \bar{x})^2$$

where
$x_i$ is the value of the luminance at pixel I;
T is the tree under consideration; and
$\bar{x}$ is the mean value of the luminance in the tree.

Using the above definitions, the reduction in energy according to the above formula (which can be thought of as the "energy of the edge e") can be written as $$\begin{aligned} E_e &= f(T) - f(U) - f(V) = E_T - E_U - E_V \\ &= \sum_{i \in T}(x_i - \bar{x}_T)^2 - \sum_{i \in U}(x_i - \bar{x}_U)^2 - \sum_{i \in V}(x_i - \bar{x}_V)^2 \\ &= \sum_{i \in U}(x_i - \bar{x}_T)^2 + \sum_{i \in V}(x_i - \bar{x}_T)^2 - \sum_{i \in U}(x_i - \bar{x}_U)^2 - \sum_{i \in V}(x_i - \bar{x}_V)^2 \\ &= \sum_{i \in U}(x_i - \bar{x}_U + \bar{x}_U - \bar{x}_T)^2 + \sum_{i \in V}(x_i - \bar{x}_V + \bar{x}_V - \bar{x}_T)^2 - \\ &\quad \sum_{i \in U}(x_i - \bar{x}_U)^2 - \sum_{i \in V}(x_i - \bar{x}_V) \\ &= N_U(\bar{x}_U - \bar{x}_T)^2 + N_V(\bar{x}_V - \bar{x}_T)^2 \\ &= N_U(\bar{x}_U - \bar{x}_T)^2 \left(1 + \frac{N_U}{N_T - N_U}\right) \end{aligned}$$

where N refers to the number of vertices in the indicated tree.

The method by which seclusion is calculated can easily be adapted to calculate this quantity across the tree. This can be done by counting the number of vertices encountered and determining the sum of the pixel values encountered while working inwards from the leaves. This method may be explained in more detail with reference to FIGS. 22-25. FIGS. 22-25 are based on the same input data that was used in previous description.

In these Figures, the pixel values (in this case, luminance values) are shown inside the circles corresponding to each pixel, or vertex of the graph. The edges of the minimum spanning tree are shown as lines connecting the vertices.

In the illustrative embodiment, the pixels are considered in a scanning raster sequence, in rows from left to right and from top to bottom of the graph. Thus, scanning in the raster sequence, leaves of the tree (vertices attached to only one edge) are identified and processed. At each stage the number n of vertices encountered and an accumulated sum s of luminance values of those vertices are recorded. At the leaves of the tree, n=1 and s is the pixel value. Vertices that have been dealt with are shown surrounded by a square box in FIG. 22.

Once a vertex has been processed, the corresponding edge is removed from the tree. Thus leaves that have been newly created during the scanning raster pass may be encountered later in the same scanning raster pass and can also be processed as is the case at the top left of the graph. So this first stage scanning raster pass results in the calculation of accumulated vertex counts and sums for eight of the 20 vertices of the graph, as shown in FIG. 22.

In FIG. 23, edges that were removed during the first stage are now shown as dotted lines. New leaves are revealed and, once again, several vertices can be dealt with in one pass because of the raster scanning pattern.

In FIG. 24, only two leaves of the tree remain and these are both removed. A single isolated pixel (with value 8) remains and there is no need to process this because all the edges have been removed from the graph. Note that there is no guarantee that three passes are sufficient to remove all edges from a graph of this size.

The final stage is to go back through all the edges and to apply the formula derived above to obtain an energy value for each edge, based on the accumulated values for the pixel whose processing was responsible for the removal of that edge. The cumulative total of the pixel values for all 20 pixels in the exemplary image is 93, giving a mean value of the luminance in the tree $\bar{x}_T$ of 4.65. Thus for example, the edge energy of the third edge from the left on the bottom row of FIG. 24 is calculated as follows:

$$N_U = 10$$

$$\bar{x}_U = s/N_U = 30/10 = 3$$

$$\bar{x}_T = 4.65$$

giving an edge energy of 54.5 in accordance with the above formula.

The respective energy values for all edges are shown in FIG. 25.

When selecting an edge for removal using this method, the edge for which this energy is maximized is selected. In this example, this would be the edge with an energy of 57.4, and this edge would be removed.

The energy measure could also be combined with edge weights, seclusion, or other quantities mentioned previously, to obtain a more complex criterion for edge selection.

A segmentation algorithm according to the invention has been described with reference to two-dimensional images. The same approach could be used with image sequences, with an appropriate definition of connectivity between pixels in successive images.

The invention claimed is:

1. A computer implemented method of image segmentation, in which the pixels of the image are represented by the vertices of a graph, the adjacency of pixels is represented by the edges of the graph, the edges are assigned, using a data processor, weights representing a measure of dissimilarity between adjacent pixels, a minimum spanning tree of the graph (or an approximation thereto) is generated using the data processor, and edges are removed successively using the data processor from the minimum spanning tree to create a spanning forest, the trees of which correspond to segments of the image, wherein the selection of an edge for removal from the spanning forest depends on a measure of distance from the edge to leaves of the tree in which the edge resides.

2. A method according to claim 1, in which a measure for selection of an edge depends on a measure of the two trees that would be created by removal of the edge.

3. A method according to claim 2 in which the measure for an edge is the difference between a function of the pixels in the tree containing the edge and the sum of the values of the function of the pixels in the two trees that would be created by removal of the edge.

4. A method according to claim 3, in which the function is an energy function.

5. A method according to claim 4, in which the energy value of pixels in a tree is related to the square of the difference between the pixel values of pixels in the tree and the mean pixel value of the tree.

6. A method according to claim 2, in which the measure for selection of an edge depends on a measure of size of the two trees that would be created by removal of the edge.

7. A method according to claim 6, wherein size is measured as the number of vertices forming a tree.

8. A method according to claim 1 in which the measure for each edge in a tree is calculated by a recursive algorithm.

9. A method according to claim 8, in which the measure is set to an initial value for a first set of edges adjoining leaves of the tree, wherein the measure is incremented or accumulated for a subsequent set of edges adjoining said first set of edges and wherein the process is repeated until all edges have been considered.

10. A method according to claim 8, in which the measure is set to an initial value for edges adjoining leaves of the tree, those edges are temporarily removed, the measure is incremented or accumulated and the process repeated until no edges remain.

11. A method according to claim 10 in which edge weights are included in the accumulation process.

12. A method according to claim 10, in which the accumulation of the measure is halted when two leaves remain in the tree and the measure is set to a constant value for the remainder of the tree.

13. A method according to claim 1, in which the measure for selection of an edge depends on the pixel values of the graph.

14. A method according to claim 1, in which the process of vertex or edge removal is carried out in a predetermined scanning order over the vertices or edges in the graph.

15. A method according to claim 14, wherein said scanning order is a raster pattern.

16. A method according to claim 1, in which the measure for selection of an edge depends on the edge weights of the graph.

17. A method according to claim 16, in which the chosen edge maximizes the product of the edge weights and the measure.

18. A method according to claim 1, in which the selection of an edge is preceded by selection of a tree from which to remove that edge.

19. A method according to claim 18, in which the measure for selection of a tree depends on a combination of any or all of the following properties: the vertex count of the tree, the average edge weight of the tree, the total edge weight of the tree, a function of the pixel values and edge weights of the tree.

* * * * *